Patented Jan. 30, 1945

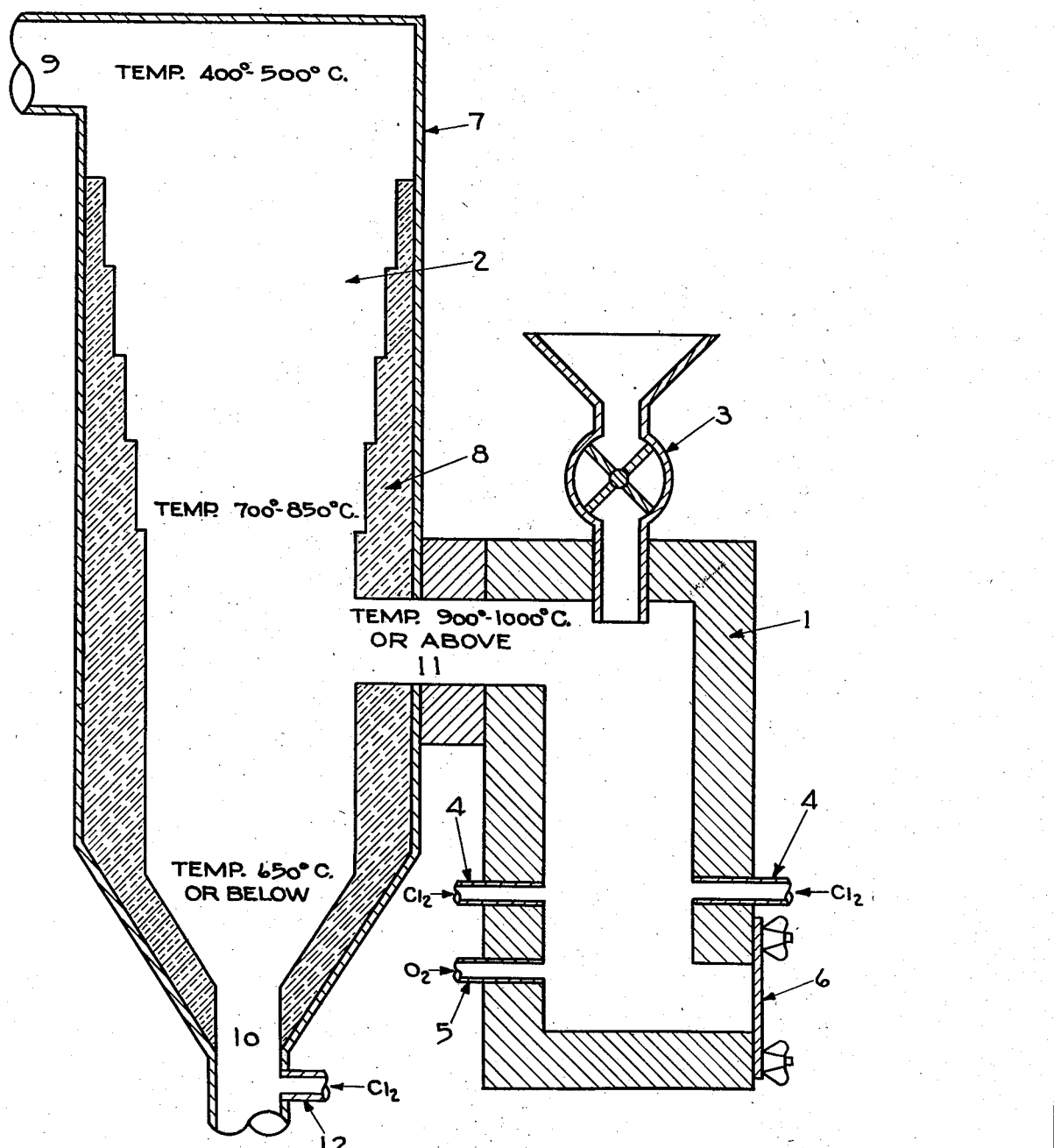

2,368,323

UNITED STATES PATENT OFFICE 2,368,323

TREATMENT OF CHLORIDES OF CHROMIUM

Alphonse Pechukas, Akron, Ohio, assignor to Pittsburgh Plate Glass Company, Pittsburgh, Pa., a corporation of Pennsylvania Application July 26, 1941, Serial No. 404,230

6 Claims. (Cl. 75—113)

This invention relates to the production of chromic chloride of high purity and in the form of large brilliantly colored crystals. In United States Letters Patent Nos. 2,185,218, 2,240,345, and 2,242,257, methods are described wherein a chromium bearing material is chlorinated and chromic chloride is formed and vaporized. This vapor is thereafter condensed by suitable means.

The condensed chloride thus produced is often of very fine crystal size and is often of poor color. In many cases it is highly impure and contains substantial quantities of iron and/or magnesium chloride. Moreover, when the process is conducted in accordance with the process described in an application for United States Letters Patent Serial No. 378,084, filed February 8, 1941, by Irving E. Muskat, the chromium chloride often comprises a mixture of water soluble chromic chloride, water insoluble chromic chloride and some chromous chloride. This is undesirable since the product is therefore nonuniform and in the water soluble form.

In accordance with the present invention I have discovered that the character and appearance of the chromic chloride may be materially improved by heating the product under conditions whereby decomposition of the chloride is avoided. Generally, the reaction is conducted in an atmosphere which is substantially free from oxygen. Preferably, the treatment is conducted in an atmosphere of chlorine since by this means it is possible to prevent reduction of the chloride to the chromous state and to insure production of a substantially water insoluble product. The process may also be conducted in the presence of inert gases such as carbon dioxide, carbon monoxide, nitrogen, etc., or under other conditions under which conversion of the chloride to another compound of chromium is minimized.

The treatment of the chloride or chlorides of chromium may be conducted in any convenient chamber under conditions which permit retention of a major portion of the chloride in the solid phase. If desired, the solid may be contacted with hot gases which may pass through a pervious bed of the chloride to be treated and impurities withdrawn from the solid chloride by means of the gases. Alternatively, the chloride in finely divided form may be dispersed in the hot gases and allowed to settle countercurrently through a stream thereof in suitable chamber, such as a tower.

Preferably, chlorine is used as the hot gas for this purpose. The chloride of chromium to be treated should preferably be finely divided. In general, it is found that chromium chloride condensed in vapor phase from the vapor mixtures produced by the processes set forth in the above patents and in an application Serial No. 394,053, filed May 19, 1941, by Irving E. Muskat, is very fine and accordingly, further treatment to secure a more finely divided product is unnecessary. Generally, the product undergoing treatment possesses a particle size of about minus 50 mesh.

The temperature of treatment should not be less than about 400° C. but should not be so high as to prevent retention of a substantial quantity of chloride of chromium in solid phase. Generally, the temperature is maintained within a temperature range of 400 to 850° C. and preferably, the temperature should be maintained at about 550 to 750° C.

The time of treatment depends largely upon the method of treatment used. When the chromium chloride is dispersed in a gas stream and permitted to settle, a comparatively short time, such as a period of 5 minutes may be suitable. On the other hand, somewhat longer periods of treatment may be required when the chloride of chromium is treated by other means. Thus, when a porous bed thereof is heated and chlorine gas is passed therethrough, at least 15 minutes may be required.

The process is particularly effective when carried out in conjunction with a process of vapor phase condensation such as is described in application Serial No. 394,053, filed May 19, 1941. In accordance with this process the condensation is conducted in a tower and the vapors from the chlorination furnace are introduced into a lower or central portion of the tower, being allowed to flow upwardly toward the tower outlet. During this treatment chromium chloride particles condense in the gas phase and in the form of finely divided particles adjacent the upper portion of the tower and settle by force of gravity countercurrently to the upward moving vapors. As the chromium chloride crystals fall through the chromium chloride vapor, the crystals are bathed by the vapors and thereby iron chloride or other halide which may have been condensed therewith is revolatilized. At the same time, these crystals serve as nuclei for the condensation of a further portion of chromium chloride whereby crystals of substantial size may be secured and a dust-free product is thereby obtained.

The invention will be more fully understood by reference to the accompanying drawing which is a diagrammatic section view of an apparatus capable of use in accordance with the present invention. As therein illustrated, the apparatus comprises a chlorination shaft furnace 1, connected to a condenser 2. The furnace is provided with a hopper and a feeder 3, for feeding ore into the furnace, chlorine tuyères 4, air or oxygen tuyères 5, and a suitable outlet for unchlorinated residue. The condenser comprises a cylindrical shell 7, lined with heat insulation 8. In order to permit the establishment of zones of different temperature throughout the column, the thickness of the insulation is varied, tapering as illustrated, toward the upper portion of the tower so that the uppermost portion thereof may be substantially uninsulated. In like manner, the thickness of insulation at the base of the condenser may be less than that at the central portion thereof. The condenser is provided with an inlet 11, for vaporized chlorides, an outlet 10, for removing condensed chloride and an outlet 9, for removal of gases. Often the condenser inlet is located as to introduce the halide vapors tangentially in order to cause the gases to whirl within the condenser.

In the operation of this process the furnace is heated to a suitable high temperature, for example, 1000° C. by burning coke or combustible gas therein. Thereafter, a charge of ore and carbon is introduced by means of the feeder 3, and chlorine and air or oxygen introduced through tuyères 4 and 5, respectively, and chlorination is initiated. The vapors of chromium and iron chloride formed are withdrawn into the condenser through inlet 11, at a temperature as high as about 850 to 1000° C. and often much higher than this value, and are allowed to pass upwardly through the condenser. During this upward passage they are cooled to a temperature of 700 to 850° C. at a central portion of the condenser designated in the drawing and to a temperature of about 400 to 500° C. at the top of the tower, whereupon chromic chloride is condensed. By use of a condenser of sufficient diameter and height, it is possible to effect the major portion of the condensation in vapor phase, whereby condensation of chromic chloride upon the walls and consequent plugging is minimized. This permits production of chromic chloride crystals of uniform crystal structure.

The chromic chloride crystals thus formed fall through the condenser to the base thereof and are removed through outlet 10. It will be noted that a large portion of the condensation of the chromic chloride occurs in an upper portion of the tower and that the crystals thus formed settle by force of gravity through the upwardly directed stream of vaporized chlorides. Thus, the crystals are bathed in an atmosphere of chloride gases at a temperature which gradually increases until the crystals have fallen below inlet 11, and iron chloride or other impurity which may have been condensed therewith is revolatilized. During this treatment these crystals grow due to condensation of a further quantity of chromium chloride thereupon whereby comparatively large crystals are obtained.

In order to maintain the process in continuous operation it is preferred to introduce ore, chlorine and carbon and oxygen, if necessary, into the furnace reactor at a rate sufficient to maintain the temperature of reactor at least 900° C. and preferably above 1250° C. Ordinarily, this may be done as described in Patents 2,185,218, 2,240,345, and 2,242,257, previously referred to, by regulating the rate of introduction of chlorine and carbon-ore mixtures, preferably in the form of briquettes in accordance with periodic or continuous observation of the temperature of the reactor. Thus, if the temperature within the reactor begins to increase to an undesirable degree, the rate of introduction of ore, chlorine, carbon and air may be decreased, while if the temperature is too low these rates may be increased. The temperatures may also be controlled by regulating the rate of withdrawal of the chlorinated residue since a large amount of heat may be dissipated by rapid removal of the residue and the reactor cooled by cool incoming ore. Moreover, the temperature may be controlled by control of the amount of carbon and air or oxygen which is introduced. For a given carbon concentration an increase in the rate of chlorine introduction tends to increase the rate of reaction and consequently, the temperature of operation.

If difficulty is encountered in maintaining the temperature, lumps of carbonaceous material such as coke may be introduced with or without briquettes of ore and the rate of oxygen introduced increased to burn the coke. If the reaction becomes excessively hot it may be cooled by introduction of carbon dioxide.

Since the temperature of the reaction may be regulated with comparative ease at a temperature as high as about 850° C. and particularly above 1250° C., the rate of chlorination is capable of wide variation. In consequence, it is possible to control the temperature within the condenser over a wide area by variation of the rate of chlorination while maintaining the temperature of chlorination at the required value without externally heating the reactor or the condenser. This is particularly advantageous since the necessity of heating a portion of the condenser is eliminated and thus, it is possible to construct the condenser essentially of heat insulating material. Thus, if the temperature at the top of the tower becomes too low, the temperature and/or rate of chlorination may be increased. Likewise, if the temperature within the condenser becomes too high, the temperature and/or rate of chlorination may be decreased. Temperatures at the various portions of the condenser or furnace may be determined by usual thermocouples inserted in suitably located thermocouple wells.

The temperature within the condenser for any given through-put is also dependent upon the size of the condenser. Thus, an increase in the height and/or diameter of a condenser permits establishment of a lower temperature. At all events, the condenser should be sufficiently large to permit the major portion of the condensation to occur out of contact with the furnace walls, whereby most of the chromic chloride is condensed before the gases containing the chloride contact to any substantial degree condenser walls which are cooled to a temperature capable of condensing chromic chloride. In usual operation, condensers having a cross-sectional area of at least about 3 square feet are utilized. In addition, the temperature within the condenser may be controlled by control of the thickness of the insulation. Thus, a variation in temperature from the point of entry to the top of the tower is insured by varying the thickness of insulation throughout the tower.

The carbon concentration in the ore-carbon mixture may be varied in accordance with the amount of oxygen and chlorine introduced into the furnace. When 25 to 50 percent excess chlorine is utilized and sufficient oxygen added to prevent sintering, carbon concentrations of 20 to 25 percent have been found suitable. On the other hand, a decrease in the chlorine concentration requires an increase in the carbon concentration required for substantially complete chlorination and in such cases, 35 to 50 percent carbon is used. The amount of oxygen or air required varies to some extent in accordance with the carbon concentration since with increased carbon concentrations some increase in air or oxygen is required. Generally, from one-half to three volumes of air per volume of chlorine is used.

Gaseous chlorine which may be preheated, if desired, is introduced into the lower portion of the condenser through inlet 12, and flows upward countercurrently to the settling chloride crystals, thereby bathing the crystals and permitting recrystallization of the chloride and production of crystals of increased size and purity. The temperature below the inlet 11, is maintained above 400° C. and preferably 550 to 750° C., in order to insure the desired recrystallization and purification. Ultimately, the chromium chloride settles to the base of a condenser where it is allowed to cool to below 300° C. and is withdrawn through outlet 10.

The amount of chlorine introduced into the condenser is capable of some variation but is preferably sufficient to minimize or prevent diffusion of air or other gases from the upper portion of the condenser and to establish an atmosphere in the lower portion of the condenser which is largely chlorine, together with more or less chromium and/or iron chloride vapor. Generally, at least 5 percent by weight of the chlorine introduced into the furnace for chlorination purposes is introduced into the condenser.

The process may be controlled to some degree by regulation of the rate of withdrawal of the chromic chloride from the base of the condenser. Thus, if it is desired to conduct the chlorine treatment in vapor phase the chromic chloride obtained may be withdrawn substantially as rapidly as formed. More often it is desirable to establish a porous bed of chloride of chromium adjacent the base of the condenser and to treat such bed. In such a case the condensed chromium chloride is allowed to accumulate to form a bed of 3 to 12 inches or more in depth. Such a bed is often desirable in order to minimize leakage of chlorine through the condenser outlet and also to permit the chromic chloride to cool to below 300° C. before the chloride is exposed to the atmosphere.

Uncondensed halides and exhaust gases are withdrawn through outlet 9. Thereafter, these gases may be treated to condense iron chloride or other halide. Processes similar to that herein described may be utilized for this purpose by use of similar condensers and maintenance of lower temperature.

While the invention has been discussed more particularly with reference to the introduction of chlorine into the base of the condenser and while the use of chlorine is found to be preferable, inert gases such as carbon dioxide or nitrogen or mixtures of chlorine and such gases may be introduced through inlet 12, if desired.

The following examples are illustrative:

Example I

A bed several inches in thickness of finely divided crystals of chromic chloride which contained 4.8 percent iron based upon the chromic chloride (the percentage of water soluble iron being about 1.2 percent) and which possessed a dull violet color was formed in a furnace and heated to 650° C. Chlorine was passed through the bed at a rate of 10 cc. per minute per gram of sample. After 30 minutes heating the sample was cooled and found to have been converted into large brilliant violet crystals which contained 0.4 percent total iron, the percentage of water soluble iron being but 0.03 percent.

Example II 100 parts by weight of ore containing 29.2% Cr, 17.0% Fe, 7.2% Mg and 6.8% Al was mixed with 45 parts by weight of ground coke and 18 parts by weight of molasses. The mixture was made up into briquettes ½ to 1 inch in diameter and the briquettes were fired at 500° C. until volatile hydrocarbons were removed.

A shaft furnace having an internal diameter of 16 inches was preheated to 1000° C. by means of a coke fire. Thereafter, a charge of briquettes was introduced and chlorine and oxygen were introduced into the base of the furnace to initiate chlorination. The vapors resulting from the chlorination were introduced into a cylindrical condenser 3 feet in diameter and 20 feet high at a point 15 feet below the top outlet thereof.

The process was carried on continuously for many hours by introducing briquettes at a rate of 125 pounds per hour, chlorine at a rate of 133 pounds per hour and air at a rate of 2 volumes of air per volume of chlorine. The temperature within the ore bed remained at 1100° C. to 1400° C. throughout the run.

The mixture of vaporized halides entered the condenser at a temperature of 1000° C. and was cooled to a temperature of 450° C. as it rose to the outlet. Chromic chloride condensed in vapor phase in the form of violet colored crystals which settled to the base of the condenser. Chlorine was introduced at a rate of 20 pounds per hour in to the base of the condenser to maintain an atmosphere which consisted mainly of chlorine and the temperature at the base of the condenser remained at 600 to 650° C. Chromic chloride in the form of violet crystals of substantially uniform size and containing less than about 0.5 percent iron was withdrawn from the base of the condenser.

During a portion of the run chromic chloride was allowed to build up in the condenser to form a bed of 6 to 12 inches in depth. In another portion of the run the chromic chloride was withdrawn substantially as rapidly as collected. The purity of the product was substantially the same in both instances.

Example III

The process of Example I was repeated by heating finely divided chromic chloride in a stream of nitrogen in lieu of chlorine. The crystal size and purity of the product was substantially increased.

Although the present invention has been described with particular reference to the specific details of certain embodiments thereof, it is not intended that such details shall be regarded as limitations upon the scope of the invention except insofar as included in the accompanying claims.

I claim:

1. A method which comprises chlorinating an iron chromium bearing material to form and vaporize a mixture of iron and chromium chlorides, introducing the vaporized chlorides into a central portion of a condenser, condensing chromium chloride in an upper portion of the condenser, regulating the rate of flow of vaporized halide such that the condensed chromium chloride settles through the vapor to the lower portion of the condenser, and introducing gaseous chlorine into said lower portion of the condenser.

2. A method which comprises chlorinating an iron chromium bearing material to form and vaporize a mixture of iron and chromium chlorides, introducing the vaporized chlorides into a central portion of a condenser, condensing chromium chlorides in an upper portion of the condenser, regulating the rate of flow of vaporized halide such that the condensed chromium chloride settles through the vapor to the lower portion of the condenser, introducing gaseous chlorine into said lower portion of the condenser, maintaining the temperature above 400° C. within a substantial portion of the said lower portion and withdrawing solid chromic chloride from the condenser.

3. A method which comprises chlorinating an iron chromium bearing material to form and vaporize a mixture of iron and chromium chlorides, introducing the vaporized chlorides into a central portion of a condenser, condensing chromium chlorides in an upper portion of the condenser, regulating the rate of flow of vaporized halide such that the condensed chromium chloride settles through the vapor to the lower portion of the condenser, introducing gaseous chlorine into said lower portion of the condenser, maintaining the temperature at about 550 to 750° C. within a substantial portion of the said lower portion and withdrawing solid chromic chloride from the condenser.

4. The process of claim 3 wherein the chromium bearing material is chromite ore.

5. A method which comprises introducing vaporized chlorides of chromium into a central portion of a condenser, condensing chromium chloride in an upper portion of the condenser, regulating the rate of flow of vaporized halide such that the condensed chromium chloride settles through the vapor to the lower portion of the condenser, and introducing gaseous chlorine into said lower portion of the condenser and withdrawing solid chromic chloride from such lower portion.

6. A method which comprises introducing a vaporized mixture of chlorides of iron and chromium into a central portion of a condenser, condensing chromium chloride in an upper portion of the condenser, regulating the rate of flow of vaporized halide such that the condensed chromium chloride settles through the vapor to the lower portion of the condenser, and introducing gaseous chlorine into said lower portion of the condenser and withdrawing solid chromic chloride from such lower portion.

ALPHONSE PECHUKAS.